United States Patent
Sun (10) Patent No.: US 11,914,223 B2
(45) Date of Patent: Feb. 27, 2024

(54) CAMERA OPTICAL LENS

(71) Applicant: Changzhou Raytech Optronics Co., Ltd., Changzhou (CN)

(72) Inventor: Wen Sun, Shenzhen (CN)

(73) Assignee: Changzhou Raytech Optronics Co., Ltd., Changzhou (CN)

(*) Notice: Subject to any disclaimer, the term of this patent is extended or adjusted under 35 U.S.C. 154(b) by 514 days.

(21) Appl. No.: 17/134,203

(22) Filed: Dec. 25, 2020

(65) Prior Publication Data
US 2022/0026674 A1  Jan. 27, 2022

(30) Foreign Application Priority Data
Jul. 27, 2020  (CN) .......................... 202010727546.2

(51) Int. Cl.
*G02B 9/64* (2006.01)
*G02B 13/18* (2006.01)

(52) U.S. Cl.
CPC .............. *G02B 9/64* (2013.01); *G02B 13/18* (2013.01)

(58) Field of Classification Search
CPC ...... G02B 9/64; G02B 13/0045; G02B 13/18; G02B 13/04; G02B 13/06
See application file for complete search history.

(56) References Cited

U.S. PATENT DOCUMENTS
2021/0116684 A1* 4/2021 Jung .................. G02B 13/0045

FOREIGN PATENT DOCUMENTS
CN    110515187 A * 11/2019  ......... G02B 13/0045

OTHER PUBLICATIONS

Duerr, Meuret, and Thienpont, Potential Benefits of Free-Form Optics in On-Axis Imaging Applications with High Aspect Ration, Optics Express, vol. 21, pp. 31072-31081 (Year: 2013).*
Melles Griot notes on lens shape (Year: 2010).*

* cited by examiner

*Primary Examiner* — Tuyen Tra
(74) *Attorney, Agent, or Firm* — W&G Law Group (57) ABSTRACT

A camera optical lens includes, from an object side to an image side, a first lens, a second lens, a third lens, a fourth lens, a fifth lens, a sixth lens, a seventh lens, and an eighth lens. At least one of the first lens, the second lens, the third lens, the fourth lens, the fifth lens, the sixth lens, the seventh lens, or the eighth lens has a free-form surface, and the camera optical lens satisfies: $0.80 \leq f6/f5 \leq 3.00$; and $-6.00 \leq R12/R11 \leq -2.50$, where f5 denotes a focal length of the fifth lens, f6 denotes a focal length of the sixth lens, R11 denotes a central curvature radius of an object-side surface of the sixth lens, and R12 denotes a central curvature radius of an image-side surface of the sixth lens. The camera optical lens has a large aperture, a wide angle, and ultra-thinness, as well as excellent optical performance.

9 Claims, 6 Drawing Sheets

CAMERA OPTICAL LENS

TECHNICAL FIELD

The present disclosure relates to the field of optical lenses, and more particularly, to a camera optical lens suitable for portable terminal devices such as smart phones and digital cameras, and suitable for camera devices such as monitors and PC lenses.

BACKGROUND

With development of the imaging lenses, higher and higher requirements are put forward for imaging of the lens. The "night scene photography" and "background blur" of the lens have also become important indicators to measure an imaging of the lens. The structures in the related art have insufficient refractive power distribution, lens spacing and lens shape settings, resulting in insufficient ultra-thinness and insufficient wide angle of the lenses. Moreover, a rotationally symmetric aspherical surface is mostly used, but such an aspherical surface has a sufficient degree of freedom only in a meridian plane, and cannot correct aberration well. A free-form surface is a surface not rotationally symmetric, and can better balance aberration and improve imaging quality. Besides, the technology of processing for a free-form surface is gradually mature. Thus, with increasing requirements for lens imaging, it is very important to provide a free-form surface when designing a camera lens, especially in the design of a wide-angle and ultra-wide-angle lens.

SUMMARY

In view of the above-mentioned problems, a purpose of the present disclosure is to provide a camera optical lens, which has a large aperture, a wide angle, and ultra-thinness, as well as excellent optical performance.

An embodiment of the present disclosure provides a camera optical lens, the camera optical lens includes, from an object side to an image side, a first lens, a second lens, a third lens, a fourth lens, a fifth lens, a sixth lens, a seventh lens, and an eighth lens. At least one of the first lens, the second lens, the third lens, the fourth lens, the fifth lens, the sixth lens, the seventh lens, or the eighth lens has a free-form surface, and the camera optical lens satisfies:

$0.80 \leq f6/f5 \leq 3.00$; and $-6.00 \leq R12/R11 \leq -2.50$, where f5 denotes a focal length of the fifth lens, f6 denotes a focal length of the sixth lens, R11 denotes a central curvature radius of an object-side surface of the sixth lens, and R12 denotes a central curvature radius of an image-side surface of the sixth lens.

As an improvement, the camera optical lens satisfies:

$5.00 \leq d7/d6 \leq 22.00$, where d6 denotes an on-axis distance from an image-side surface of the third lens to an object-side surface of the fourth lens, and d7 denotes an on-axis thickness of the fourth lens.

As an improvement, the camera optical lens satisfies:

$-4.49 \leq f1/f \leq -1.40$;

$-2.30 \leq (R1+R2)/(R1-R2) \leq -0.53$; and $0.05 \leq d1/TTL \leq 0.14$, where f denotes a focal length of the camera optical lens, f1 denotes a focal length of the first lens, R1 denotes a central curvature radius of an object-side surface of the first lens, R2 denotes a central curvature radius of an image-side surface of the first lens, d1 denotes an on-axis thickness of the first lens, and TTL denotes a total optical length from the object-side surface of the first lens to an image plane of the camera optical lens along an optic axis.

As an improvement, the camera optical lens satisfies:

$2.71 \leq f2/f \leq 9.86$;

$-12.88 \leq (R3+R4)/(R3-R4) \leq -2.18$; and $0.02 \leq d3/TTL \leq 0.09$, where f denotes a focal length of the camera optical lens, f2 denotes a focal length of the second lens, R3 denotes a central curvature radius of an object-side surface of the second lens, R4 denotes a central curvature radius of an image-side surface of the second lens, d3 denotes an on-axis thickness of the second lens, and TTL denotes a total optical length from an object-side surface of the first lens to an image plane of the camera optical lens along an optic axis.

As an improvement, the camera optical lens satisfies:

$-48.31 \leq f3/f \leq 3.44$;

$-1.39 \leq (R5+R6)/(R5-R6) \leq 16.47$; and $0.02 \leq d5/TTL \leq 0.13$, where f denotes a focal length of the camera optical lens, f3 denotes a focal length of the third lens, R5 denotes a central curvature radius of an object-side surface of the third lens, R6 denotes a central curvature radius of an image-side surface of the third lens, d5 denotes an on-axis thickness of the third lens, and TTL denotes a total optical length from an object-side surface of the first lens to an image plane of the camera optical lens along an optic axis.

As an improvement, the camera optical lens satisfies:

$0.55 \leq f4/f \leq 2.70$;

$-0.06 \leq (R7+R8)/(R7-R8) \leq 1.47$; and $0.04 \leq d7/TTL \leq 0.19$, where f denotes a focal length of the camera optical lens, f4 denotes a focal length of the fourth lens, R7 denotes a central curvature radius of an object-side surface of the fourth lens, R8 denotes a central curvature radius of an image-side surface of the fourth lens, d7 denotes an on-axis thickness of the fourth lens, and TTL denotes a total optical length from an object-side surface of the first lens to an image plane of the camera optical lens along an optic axis.

As an improvement, the camera optical lens satisfies:

$-5.78 \leq f5/f \leq -1.92$;

$-0.01 \leq (R9+R10)/(R9-R10) \leq 0.67$; and $0.02 \leq d9/TTL \leq 0.06$, where f denotes a focal length of the camera optical lens, f5 denotes a focal length of the fifth lens, R9 denotes a central curvature radius of an object-side surface of the fifth lens, R10 denotes a central curvature radius of an image-side surface of the fifth lens, d9 denotes an on-axis thickness of the fifth lens, and TTL denotes a total optical length from an object-side surface of the first lens to an image plane of the camera optical lens along an optic axis.

As an improvement, the camera optical lens satisfies:

$-16.76 \leq f6/f \leq -1.83$;

$-1.38 \leq (R11+R12)/(R11-R12) \leq -0.33$; and $0.04 \leq d11/TTL \leq 0.14$, where f denotes a focal length of the camera optical lens, d11 denotes an on-axis thickness of the sixth lens, and TTL denotes a total optical length from an object-side surface of the first lens to an image plane of the camera optical lens along an optic axis.

As an improvement, the camera optical lens satisfies:

$0.41 \leq f7/f \leq 1.40$;

$0.26 \leq (R13+R14)/(R13-R14) \leq 1.12$; and $0.04 \leq d13/TTL \leq 0.12$, where f denotes a focal length of the camera optical lens, f7 denotes a focal length of the seventh lens, R13 denotes a central curvature radius of an object-side surface of the seventh lens, R14 denotes a central curvature radius of an image-side surface of the seventh lens, d13 denotes an on-axis thickness of the seventh lens, and TTL denotes a total optical length from an object-side surface of the first lens to an image plane of the camera optical lens along an optic axis.

As an improvement, the camera optical lens satisfies:

$-2.71 \leq f8/f \leq -0.81$;

$1.18 \leq (R15+R16)/(R15-R16) \leq 4.11$; and $0.03 \leq d15/TTL \leq 0.10$, where f denotes a focal length of the camera optical lens, f8 denotes a focal length of the eighth lens, R15 denotes a central curvature radius of an object-side surface of the eighth lens, R16 denotes a central curvature radius of an image-side surface of the eighth lens, d15 denotes an on-axis thickness of the eighth lens, and TTL denotes a total optical length from an object-side surface of the first lens to an image plane of the camera optical lens along an optic axis.

With the camera optical lens of the present disclosure, the lens has good optical performance as well as a large aperture, ultra-thinness and a wide angle. Meanwhile, at least one of the first lens, the second lens, the third lens, the fourth lens, the fifth lens, the sixth lens, the seventh lens, or the eighth lens has a free-form surface, thereby effectively correcting aberration and improving the performance of the optical system. It is suitable for mobile phone camera lens assembly and WEB camera lens formed by imaging elements for high pixel such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to better illustrate the purpose, technical solutions and advantages of the present disclosure, the embodiments of the present disclosure will be described in details as follows with reference to the accompanying drawings. However, it should be understood by those skilled in the art that, technical details are set forth in the embodiments of the present disclosure so as to better illustrate the present disclosure. However, the technical solutions claimed in the present disclosure can be achieved without these technical details and various changes and modifications based on the following embodiments.

Embodiment 1

Figure 1:
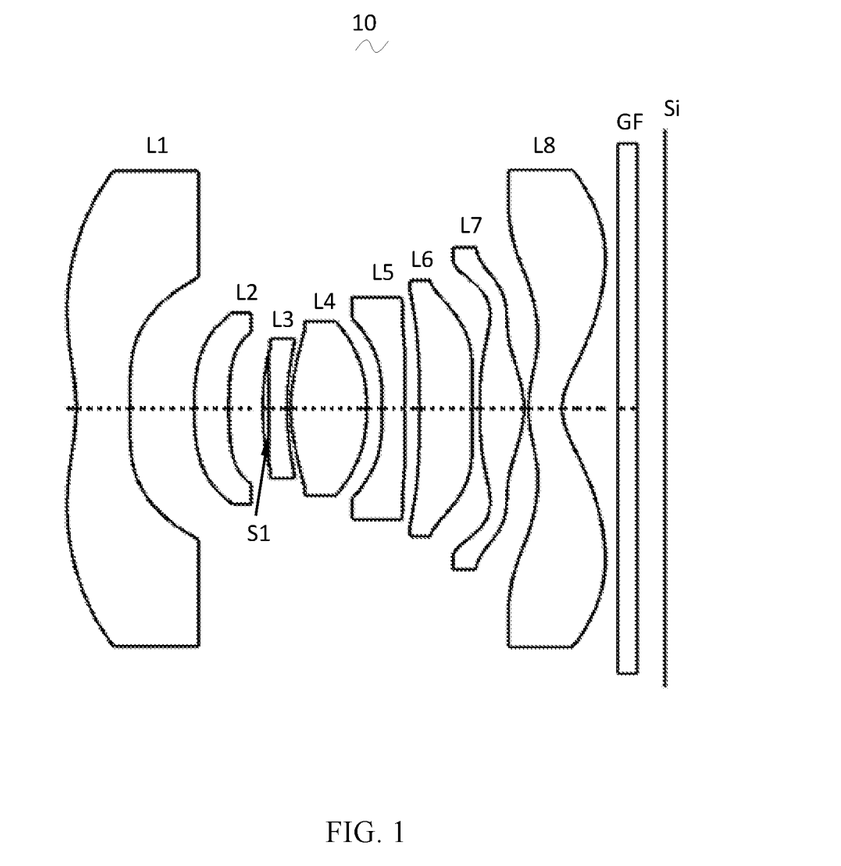
FIG. 1 is a schematic structural diagram of a camera optical lens according to Embodiment 1 of the present disclosure.

With reference to FIG. 1, the present disclosure provides a camera optical lens 10. FIG. 1 illustrates a camera optical lens 10 according to Embodiment 1 of the present disclosure. The camera optical lens 10 includes eight lenses. Specifically, the camera optical lens 10 includes, from an object side to an image side, a first lens L1, a second lens L2, an aperture S1, a third lens L3, a fourth lens L4, a fifth lens L5, a sixth lens L6, a seventh lens L7, and an eighth lens L8. Optical elements such as an optical filter GF can be provided between the eighth lens L8 and the image plane S1.

As an example, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, and the eighth lens L8 is made of a plastic material. In other embodiments, each lens can be made of another material.

As an example, it is defined that at least one of the first lens L1 to the eighth lens L8 includes a free-form surface, and the free-form surface contributes to correction of aberrations such as astigmatism, field curvature, and distortion in a wide-angle optical system, thereby improving the imaging quality.

As an example, a focal length of the fifth lens L5 is f5, and a focal length of the sixth lens L6 is f6, then the camera optical lens satisfies the following condition: $0.80 \leq f6/f5 \leq 3.00$, which specifies a ratio of the focal length of the sixth lens L6 to the focal length of the fifth lens L5. With this condition, the imaging quality can be improved.

As an example, a central curvature radius of the object-side surface of the sixth lens L6 is R11, and a central curvature radius of the image-side surface of the sixth lens L6 is R12, then the camera optical lens satisfies the following condition: −6.00≤R12/R11≤−2.50, which specifies a shape of the sixth lens L6. With this condition, a degree of light deflection can be reduced and the imaging quality can be improved.

When the camera optical lens 10 of the present disclosure includes at least one free-form surface, and the focal length of the related lens and the central curvature radius of the related lens satisfy the above-mentioned condition, the camera optical lens 10 can have high performance and meet the requirements of a large aperture, a wide angle and ultra-thinness.

As an example, an on-axis distance from the image-side surface of the third lens L3 to the object-side surface of the fourth lens L4 is d6, and an on-axis thickness of the fourth lens L4 is d7, then the camera optical lens satisfies the following condition: 5.00≤d7/d6≤22.00. With this condition, it is beneficial to balancing the field curvature of the system and improving the imaging quality. As an example, the first lens L1 has a negative refractive power, the object-side surface of the first lens L1 is a concave in a paraxial region, and the image-side surface of the first lens L1 is convex in a paraxial region. In other embodiments, the first lens L1 can have a positive refractive power.

As an example, a focal length of the first lens L1 is f1, and a focal length of the camera optical lens 10 is f, then the camera optical lens satisfies the following condition: −4.49≤f1/f≤−1.40, which specifies a ratio of the focal length of the first lens L1 to the focal length. With this condition, the first lens L1 has an appropriate negative refractive power, which is beneficial to reducing aberration of the system and achieving ultra-thinness and wide-angle of the camera lens. As an example, the camera optical lens satisfies the following condition: −2.81≤f1/f≤−1.75.

As an example, a central curvature radius of the object-side surface of the first lens L1 is R1, and a central curvature radius of the image-side surface of the first lens L1 is R2, then the camera optical lens satisfies the following condition: −2.30≤(R1+R2)/(R1−R2)≤−0.53. By reasonably controlling a shape of the first lens L1, the first lens L1 can effectively correct spherical aberration of the system. Preferably, the camera optical lens satisfies the following condition: −1.44≤(R1+R2)/(R1−R2)≤−0.66.

As an example, an on-axis thickness of the first lens L1 is d1, and an optical length of the camera optical lens 10 is TTL, then the camera optical lens satisfies the following condition: 0.05≤d1/TTL≤0.14. Within a range defined by this condition, it is beneficial to achieving ultra-thinness. Preferably, the camera optical lens satisfies the following condition: 0.07≤d1/TTL≤0.11.

As an example, a focal length of the second lens L2 is f2, and a focal length of the camera optical lens 10 is f, then the camera optical lens satisfies the following condition: 2.71≤f2/f≤9.86. By controlling the focal power of the second lens L2 with this condition, it is beneficial to correcting aberration of the optical system. As an example, the camera optical lens satisfies the following condition: 4.34≤f2/f≤7.89.

As an example, the second lens L2 has a positive refractive power, the object-side surface of the second lens L2 is convex in a paraxial region, and the image-side surface is concave at a paraxial position. In other embodiments, the second lens L2 can have a negative refractive power.

As an example, a central curvature radius of the object-side surface of the second lens L2 is R3, and a central curvature radius of the image-side surface of the second lens L2 is R4, then the camera optical lens satisfies the following condition: −12.88≤(R3+R4)/(R3−R4)≤−2.18, which specifies a shape of the second lens L2. With this condition, with development of ultra-thinness and wide-angle of the lens, it is beneficial to correcting on-axis color aberration. As an example, the camera optical lens satisfies the following condition: −8.05≤(R3+R4)/(R3−R4)≤−2.73.

As an example, the on-axis thickness of the second lens L2 is d3, and TTL denotes a total optical length from the object-side surface of the first lens to an image plane of the camera optical lens along an optic axis, which satisfies the following condition: 0.02≤d3/TTL≤0.09, which is conducive to achieving ultra-thinness. As an example, 0.04≤d3/TTL≤0.08 is satisfied.

As an example, the third lens L3 has a negative refractive power, the object-side surface of the third lens L3 is convex in a paraxial region, and the image-side surface is concave in a paraxial region.

As an example, a focal length of the third lens L3 is f3, and a focal length of the camera optical lens 10 is f, then the camera optical lens satisfies the following condition: −48.31≤f3/f≤3.44. Reasonable distribution of the focal power enables the system to have better imaging quality and lower sensitivity. As an example, the camera optical lens satisfies the following condition: −30.19≤f3/f≤2.75.

As an example, a central curvature radius of the object-side surface of the third lens L3 is R5, and a central curvature radius of the image-side surface of the third lens L3 is R6, then the camera optical lens satisfies the following condition: −1.39≤(R5+R6)/(R5−R6)≤16.47, which specifies a shape of the third lens L3. With this condition, it is beneficial to reducing a degree of deflection of light passing through the lens, and effectively reducing aberration. As an example, the camera optical lens satisfies the following condition: −0.87≤(R5+R6)/(R5−R6)≤13.18.

As an example, an on-axis thickness of the third lens L3 is d5, and TTL denotes a total optical length from the object-side surface of the first lens to an image plane of the camera optical lens along an optic axis, then the camera optical lens satisfies the following condition: 0.02≤d5/TTL≤0.13. With this condition, it is beneficial to achieving ultra-thinness. As an example, the camera optical lens satisfies the following condition: 0.03≤d5/TTL≤0.10.

As an example, the fourth lens L4 has a positive refractive power, the object-side surface of the fourth lens L4 is convex in a paraxial region, and the image-side surface is convex in a paraxial region. In other embodiments, the fourth lens L4 can have a negative refractive power.

As an example, a focal length of the fourth lens L4 is f4, and a focal length of the camera optical lens 10 is f, then the camera optical lens satisfies the following condition: 0.55≤f4/f≤2.70, which specifies a ratio of the focal length of the fourth lens L4 to the focal length of the system. With this condition, it is beneficial to improving the performance of the optical system. As an example, the camera optical lens satisfies the following condition: 0.88≤f4/f≤2.16.

As an example, a central curvature radius of the object-side surface of the fourth lens L4 is R7, and a central curvature radius of the image-side surface of the fourth lens L4 is R8, then the camera optical lens satisfies the following condition: −0.06≤(R7+R8)/(R7−R8)≤1.47, which specifies a shape of the fourth lens L4. With this condition, with development of ultra-thinness and wide-angle, it is beneficial to correcting aberration of the off-axis angle. As an example, the camera optical lens satisfies the following condition: $-0.04 \le (R7+R8)/(R7-R8) \le 1.18$.

As an example, an on-axis thickness of the fourth lens L4 is d7, and TTL denotes a total optical length from the object-side surface of the first lens to an image plane of the camera optical lens along an optic axis, then the camera optical lens satisfies the following condition: $0.04 \le d7/TTL \le 0.19$. With this condition, it is beneficial to achieving ultra-thinness. As an example, the camera optical lens satisfies the following condition: $0.06 \le d7/TTL \le 0.16$.

As an example, the fifth lens L5 has a negative refractive power, the object-side surface of the fifth lens L5 is concave in a paraxial region, and the image-side surface is concave in a paraxial region. In other embodiments, the fifth lens L5 can have a positive refractive power.

As an example, a focal length of the fifth lens L5 is f5, and a focal length of the camera optical lens 10 is f, then the camera optical lens satisfies the following condition: $-5.78 \le f5/f \le -1.92$. Limitation on the third lens L5 can effectively smooth the light angle of the camera lens and reduce tolerance sensitivity. As an example, the camera optical lens satisfies the following condition: $-3.61 \le f5/f \le -2.40$.

As an example, a central curvature radius of the object-side surface of the fifth lens L5 is R9, and a central curvature radius of the image-side surface of the fifth lens L5 is R10, then the camera optical lens satisfies the following condition: $-0.01 \le (R9+R10)/(R9-R10) \le 0.67$, which specifies a shape of the fifth lens L5. Within a range defined by this condition, with development of ultra-thinness and wide-angle, it is beneficial to correcting aberration of the off-axis angle. As an example, the camera optical lens satisfies the following condition: $-0.01 \le (R9+R10)/(R9-R10) \le 0.53$.

As an example, an on-axis thickness of the fifth lens L5 is d9, and TTL denotes a total optical length from the object-side surface of the first lens to an image plane of the camera optical lens along an optic axis, then the camera optical lens satisfies the following condition: $0.02 \le d9/TTL \le 0.06$. With this condition, it is beneficial to achieving ultra-thinness. As an example, the camera optical lens satisfies the following condition: $0.03 \le d9/TTL \le 0.05$.

As an example, the sixth lens L6 has a negative refractive power, the object-side surface of the sixth lens L6 is concave in a paraxial region, and the image-side surface is concave in a paraxial region. In other embodiments, the sixth lens L6 can have a positive refractive power.

As an example, a focal length of the sixth lens L6 is f6, and a focal length of the camera optical lens 10 is f, then the camera optical lens satisfies the following condition: $-16.76 \le f6/f \le -1.83$. Reasonable distribution of focal power enables the system to have better imaging quality and lower sensitivity. As an example, the camera optical lens satisfies the following condition: $-10.84 \le f6/f \le -2.29$.

As an example, a central curvature radius of the object-side surface of the sixth lens is R11, and a central curvature radius of the image-side surface of the sixth lens is R12, then the camera optical lens satisfies the following condition: $-1.38 \le (R11+R12)/(R11-R12) \le -0.33$, which specifies a shape of the sixth lens L6. With this condition, with development of ultra-thinness and wide-angle, it is beneficial to correcting aberration of an off-axis angle. As an example, the camera optical lens satisfies the following condition: $-0.86 \le (R11+R12)/(R11-R12) \le -0.41$.

As an example, an on-axis thickness of the sixth lens L6 is defined is d11, and TTL denotes a total optical length from the object-side surface of the first lens to an image plane of the camera optical lens along an optic axis, then the camera optical lens satisfies the following condition: $0.04 \le d11/TTL \le 0.14$. With this condition, it is beneficial to achieving ultra-thinness. As an example, the camera optical lens satisfies the following condition: $0.07 \le d11/TTL \le 0.11$.

As an example, the seventh lens L7 has a positive refractive power, the object-side surface of the seventh lens L7 is a convex at a paraxial region, and the image-side surface is convex at a paraxial region. In other embodiments, the seventh lens L7 can have a negative refractive power.

As an example, a focal length of the seventh lens L7 is f7, and a focal length of the camera optical lens 10 is f, then the camera optical lens satisfies the following condition: $0.41 \le f7/f \le 1.40$. Reasonable distribution of focal power enables the system to have better imaging quality and lower sensitivity. As an example, the camera optical lens satisfies the following condition: $0.66 \le f7/f \le 1.12$.

As an example, a central curvature radius of the object-side surface of the seventh lens L7 is R13, and a central curvature radius of the image-side surface of the seventh lens L7 is R14, then the camera optical lens satisfies the following condition: $0.26 \le (R13+R14)/(R13-R14) \le 1.12$, which specifies a shape of the seventh lens L7. With this condition, with development of ultra-thinness and wide-angle, it is beneficial to correcting aberration of an off-axis angle. As an example, the camera optical lens satisfies the following condition: $0.42 \le (R13+R14)/(R13-R14) \le 0.89$.

As an example, an on-axis thickness of the seventh lens L7 is d13, and TTL denotes a total optical length from the object-side surface of the first lens to an image plane of the camera optical lens along an optic axis, then the camera optical lens satisfies the following condition: $0.04 \le d13/TTL \le 0.12$. With this condition, it is beneficial to achieving ultra-thinness. As an example, the camera optical lens satisfies the following condition: $0.06 \le d13/TTL \le 0.09$.

As an example, the eighth lens L8 has a negative refractive power, the object-side surface of the eighth lens L8 is convex in a paraxial region, and the image-side surface is concave in a paraxial region. In other embodiments, the eighth lens L8 can have a positive refractive power.

As an example, a focal length of the eighth lens L8 is f8, and a focal length of the camera optical lens 10 is f, then the camera optical lens satisfies the following condition: $-2.71 \le f8/f \le -0.81$. Reasonable distribution of focal power enables the system to have better imaging quality and lower sensitivity. As an example, the camera optical lens satisfies the following condition: $-1.69 \le f8/f \le -1.01$.

As an example, a central curvature radius of the object-side surface of the eighth lens L8 is R15, and a central curvature radius of the image-side surface of the eighth lens L8 is R16, then the camera optical lens satisfies the following condition: $1.18 \le (R15+R16)/(R15-R16) \le 4.11$, which specifies a shape of the eighth lens L8. With this condition, with development of ultra-thinness and wide-angle, it is beneficial to correcting aberration of an off-axis angle. As an example, the camera optical lens satisfies the following condition: $1.89 \leq (R15+R16)/(R15-R16) \leq 3.29$.

As an example, an on-axis thickness of the eighth lens L8 is d15, and TTL denotes a total optical length from the object-side surface of the first lens to an image plane of the camera optical lens along an optic axis, then the camera optical lens satisfies the following condition: $0.03 \leq d15/TTL \leq 0.10$. With this condition, it is beneficial to achieving ultra-thinness. As an example, the camera optical lens satisfies the following condition: $0.05 \leq d15/TTL \leq 0.08$.

As an example, an F number FNO of the camera optical lens 10 is smaller than or equal to 1.80, which realizes a large aperture and good imaging performance.

As an example, a ratio of the optical length TTL of the camera optical lens to the full FOV image height IH (in a diagonal direction) is smaller than or equal to 2.15, which is beneficial to achieving ultra-thinness. The FOV in the diagonal direction is larger than or equal to 119°, which is beneficial to achieving a wide angle.

As an example, the optical length TTL of the camera optical lens 10 is smaller than or equal to 7.04 mm, which is beneficial to achieving ultra-thinness. As an example, the optical length TTL is smaller than or equal to 6.72 mm.

When the above-mentioned condition is satisfied, the camera optical lens 10 has good optical performance, and when the free-form surface is adopted, the designed image plane area can be matched with an actual use area, thereby improving the image quality of the effective area to the greatest extent; and according to the characteristics of the camera optical lens 10, the camera optical lens 10 is especially suitable for a mobile phone camera lens assembly and a WEB camera lens composed of imaging elements for high pixels such as CCD and CMOS.

The camera optical lens 10 of the present disclosure will be described in the following by examples. The reference signs described in each example are as follows. The unit of the focal length, the on-axis distance, the central curvature radius, and the on-axis thickness is mm.

TTL: the optical length (an on-axis distance from the object-side surface of the first lens L1 to the image plane Si), in a unit of mm.

FNO: a ratio of an effective focal length of the camera optical lens to an entrance pupil diameter.

Table 1, Table 2, and Table 3 show design data of the camera optical lens 10 according to the Embodiment 1 of the present disclosure. Herein, the object-side surface and image-side surface of the third lens L3 are free-form surfaces.

TABLE 1

| | R | | d | nd | vd |
|---|---|---|---|---|---|
| S1 | ∞ | d0= | −2.094 | | |
| R1 | −2.087 | d1= | 0.584 nd1 | 1.5444 v1 | 56.43 |
| R2 | −41.667 | d2= | 0.696 | | |
| R3 | 3.293 | d3= | 0.379 nd2 | 1.6501 v2 | 21.44 |
| R4 | 6.185 | d4= | 0.373 | | |
| R5 | 4.110 | d5= | 0.261 nd3 | 1.5444 v3 | 56.43 |
| R6 | 2.728 | d6= | 0.040 | | |
| R7 | 1.940 | d7= | 0.828 nd4 | 1.5444 v4 | 56.43 |
| R8 | −2.054 | d8= | 0.169 | | |
| R9 | −7.315 | d9= | 0.240 nd5 | 1.6800 v5 | 18.40 |
| R10 | 7.058 | d10= | 0.166 | | |
| R11 | −9.788 | d11= | 0.571 nd6 | 1.5444 v6 | 56.43 |
| R12 | 53.155 | d12= | 0.081 | | |
| R13 | 7.028 | d13= | 0.481 nd7 | 1.5444 v7 | 56.43 |
| R14 | −1.032 | d14= | 0.046 | | |

TABLE 1-continued

| | R | | d | nd | vd |
|---|---|---|---|---|---|
| R15 | 1.257 | d15= | 0.367 nd8 | 1.5661 v8 | 37.70 |
| R16 | 0.585 | d16= | 0.600 | | |
| R17 | ∞ | d17= | 0.215 ndg | 1.5168 vg | 64.17 |
| R18 | ∞ | d18= | 0.303 | | |

Herein, the representation of each reference sign is as follows.

S1: aperture;
R: curvature radius at a center of an optical surface;
R1: central curvature radius of an object-side surface of a first lens L1;
R2: central curvature radius of an image-side surface of the first lens L1;
R3: central curvature radius of an object-side surface of a second lens L2;
R4: central curvature radius of an image-side surface of the second lens L2;
R5: central curvature radius of an object-side surface of a third lens L3;
R6: central curvature radius of an image-side surface of the third lens L3;
R7: central curvature radius of an object-side surface of a fourth lens L4;
R8: central curvature radius of an image-side surface of the fourth lens L4;
R9: central curvature radius of an object-side surface of a fifth lens L5;
R10: central curvature radius of an image-side surface of the fifth lens L5;
R11: central curvature radius of an object-side surface of a sixth lens L6;
R12: central curvature radius of an image-side surface of the sixth lens L6;
R13: central curvature radius of an object-side surface of a seventh lens L7;
R14: central curvature radius of an image-side surface of the seventh lens L7;
R15: central curvature radius of an object-side surface of an eighth lens L8;
R16: central curvature radius of an image-side surface of the eighth lens L8;
R17: central curvature radius of an object-side surface of an optical filter GF;
R18: central curvature radius of an image-side surface of the optical filter GF;
d: on-axis thickness of the lens, and on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;

d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the eighth lens L8;
d15: on-axis thickness of the eighth lens L8;

vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
vg: abbe number of the optical filter GF.

Table 2 shows aspherical data of each lens in the camera optical lens 10 according to the Embodiment 1 of the present disclosure.

TABLE 2

| | Conic coefficient | Aspherical coefficient | | | | |
|---|---|---|---|---|---|---|
| | k | A4 | A6 | A8 | A10 | A12 |
| R1 | −1.5944E+01 | 8.7143E−02 | −4.1964E−02 | 1.6434E−02 | −4.8228E−03 | 1.0043E−03 |
| R2 | −3.4107E+01 | 3.0611E−01 | −2.6147E−01 | 3.2414E−01 | −3.2039E−01 | 2.2067E−01 |
| R3 | 4.9421E+00 | 9.8528E−02 | 8.5859E−02 | −3.6229E−01 | 1.2579E+00 | −2.2506E+00 |
| R4 | 1.4114E+01 | 1.9779E−01 | 2.5977E−02 | 3.6237E−01 | −4.1308E−01 | 9.5039E−02 |
| R7 | 7.7307E−01 | −2.0108E−01 | 3.3219E−01 | −6.8867E−01 | 1.0103E+00 | −1.1372E+00 |
| R8 | 7.5093E−01 | −1.7108E−01 | 8.3155E−02 | 4.8202E−01 | −1.6256E+00 | 2.3543E+00 |
| R9 | 4.3308E+01 | −4.5490E−01 | 9.6346E−02 | 1.1536E+00 | −2.5736E+00 | 2.4967E+00 |
| R10 | 1.2586E+01 | −2.0628E−01 | −1.0112E−01 | 9.5023E−01 | −1.7709E+00 | 1.7770E+00 |
| R11 | 5.0000E+01 | 1.1147E−01 | −3.0876E−01 | 4.4028E−01 | −3.2883E−01 | 4.7917E−02 |
| R12 | −5.0000E+01 | −2.5184E−02 | −1.9059E−01 | −2.5009E−01 | 7.3726E−01 | −6.5734E−01 |
| R13 | 8.0267E+00 | 2.0995E−01 | −3.1819E−01 | 1.7256E−01 | 1.3572E−01 | −3.6357E−01 |
| R14 | −6.9749E−01 | 5.8483E−01 | −8.3612E−01 | 1.6876E+00 | −2.1070E+00 | 1.5307E+00 |
| R15 | −1.2393E+00 | −4.7248E−01 | 1.8019E−01 | 7.6514E−02 | −1.2086E−01 | 6.1663E−02 |
| R16 | −2.9504E+00 | −2.3743E−01 | 1.8684E−01 | −9.8830E−02 | 3.5406E−02 | −8.5973E−03 |
| | Conic coefficient | Aspherical coefficient | | | | |
| | k | A14 | A16 | A18 | A20 | / |
| R1 | −1.5944E+01 | −1.4240E−04 | 1.3068E−05 | −6.9960E−07 | 1.6553E−08 | / |
| R2 | −3.4107E+01 | −8.8804E−02 | 1.3795E−02 | 1.8972E−03 | −6.5250E−04 | / |
| R3 | 4.9421E+00 | 2.2652E+00 | −1.2036E+00 | 2.5386E−01 | 0.0000E+00 | / |
| R4 | 1.4114E+01 | 7.0466E−01 | −6.5061E−01 | 0.0000E+00 | 0.0000E+00 | / |
| R7 | 7.7307E−01 | 8.6618E−01 | −3.0387E−01 | 0.0000E+00 | 0.0000E+00 | / |
| R8 | 7.5093E−01 | −1.7448E+00 | 5.5517E−01 | 0.0000E+00 | 0.0000E+00 | / |
| R9 | 4.3308E+01 | −9.1456E−01 | −1.9955E−01 | 1.7879E−01 | 0.0000E+00 | / |
| R10 | 1.2586E+01 | −1.0171E+00 | 3.0936E−01 | −3.8908E−02 | 0.0000E+00 | / |
| R11 | 5.0000E+01 | 9.4818E−02 | −5.6936E−02 | 9.6307E−03 | 0.0000E+00 | / |
| R12 | −5.0000E+01 | 2.8521E−01 | −5.9536E−02 | 4.6341E−03 | 0.0000E+00 | / |
| R13 | 8.0267E+00 | 2.9864E−01 | −1.2447E−01 | 2.6766E−02 | −2.3569E−03 | / |
| R14 | −6.9749E−01 | −6.7573E−01 | 1.8014E−01 | −2.6701E−02 | 1.6904E−03 | / |
| R15 | −1.2393E+00 | −1.7084E−02 | 2.7364E−03 | −2.3906E−04 | 8.8530E−06 | / |
| R16 | −2.9504E+00 | 1.4728E−03 | −2.2038E−04 | 1.9146E−05 | −7.1779E−07 | / | d16: on-axis distance from the image-side surface of the eighth lens L8 to the object-side surface of the optical filter GF;
d17: on-axis thickness of optical filter GF;
d18: on-axis distance from the image-side surface of the optical filter GF to the image plane Si;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
nd7: refractive index of d-line of the seventh lens L7;
nd8: refractive index of d-line of the eighth lens L8;
ndg: refractive index of d-line of the optical filter GF;

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1),$$

where k represents a conic coefficient, A4, A6, A8, A10, A12, A14, A16, A18, and A20 represent aspherical coefficients, c represents the curvature at the center of the optical surface, r represents a vertical distance between a point on an aspherical curve and the optical axis, Z represents an aspherical depth (a vertical distance between a point on an aspherical surface, having a distance of r from the optic axis, and a surface tangent to a vertex of the aspherical surface on the optic axis).

For convenience, the aspherical surface of each lens adopts the aspherical surface shown in the above equation (1). However, the present disclosure is not limited to the aspherical surface defined by the polynomial form expressed by the equation (1).

Table 3 shows free-form surface data in the camera optical lens 10 according to the Embodiment 1 of the present disclosure.

TABLE 3

| | | | | Free-form surface coefficient | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R5 | 2.3993E+00 | 9.2198E-02 | 1.8623E-01 | 9.2564E-02 | 2.2269E-02 | 5.1921E-02 | 4.9009E-02 | 1.7571E-02 |
| R6 | 3.8455E+00 | -1.9836E-01 | -3.9411E-01 | -1.9774E-01 | 3.8700E-01 | 1.1569E+00 | 1.1368E+00 | 3.8383E-01 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R5 | -5.1271E-03 | 9.7834E-03 | 6.6800E-02 | 4.9725E-02 | 1.2131E-02 | -4.5271E-02 | -2.4541E-01 | -5.4460E-01 |
| R6 | -7.6671E-01 | -3.0923E+00 | -4.5089E+00 | -3.0602E+00 | -7.6217E-01 | 9.1514E-01 | 4.5984E+00 | 9.2649E+00 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R5 | -6.4381E-01 | -3.2122E-01 | -6.4135E-02 | 0.0000E+00 | 0.0000E+00 | 0.0000E+00 | 0.0000E+00 | 0.0000E+00 |
| R6 | 8.9538E+00 | 4.7363E+00 | 9.1994E-01 | -5.0276E-01 | -3.0043E+00 | -7.7728E+00 | -1.0133E+01 | -7.4941E+00 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | -3.2326E+00 | -5.1395E-01 | 0.0000E+00 | 0.0000E+00 | 0.0000E+00 | 0.0000E+00 | 0.0000E+00 | 0.0000E+00 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |

$$z = \frac{cr^2}{1 + \sqrt{1 - (1+k)c^2r^2}} + \Sigma_{i=1}^{N} B_i E_i(x, y), \quad (2)$$

where k represents a conic coefficient, Bi represents a free-form surface coefficient, c represents the curvature at the center of the optical surface, r represents a vertical distance between the a point on the free-form surface and the optical axis, x represents the x-direction component of r, y represents the y-direction component of r, z represents aspherical depth (a vertical distance between a point on an aspherical surface, having a distance of r from the optic axis, and a surface tangent to a vertex of the aspherical surface on the optic axis)

For convenience, each free-form surface adopts the surface type defined by the extended polynomial shown in the above equation (1). However, the present disclosure is not limited to the free-form surface defined by the polynomial form expressed by the equation (1).

Figure 2:
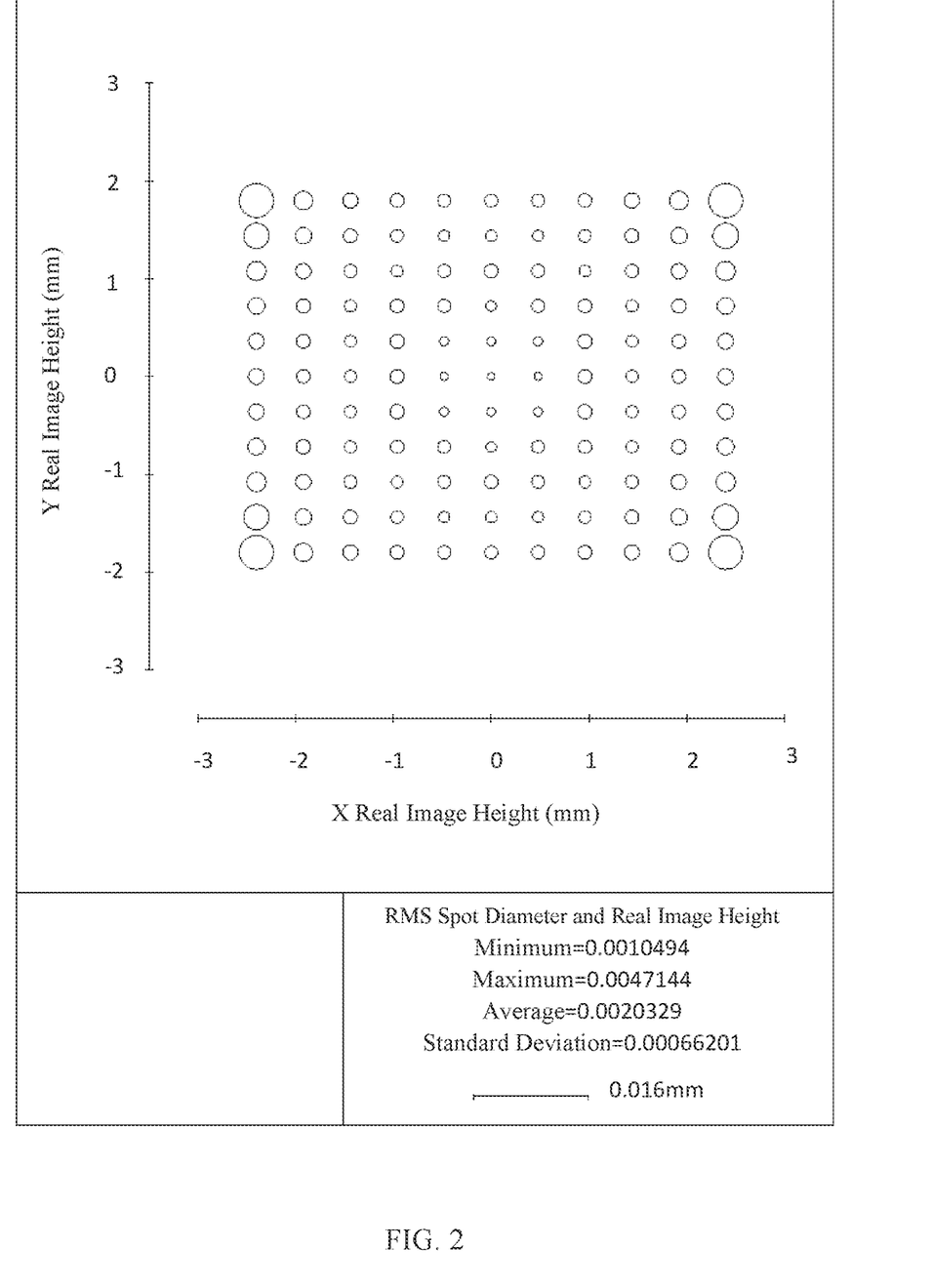
FIG. 2 illustrates a situation where RMS spot diameter of the camera optical lens shown in FIG. 1 is located in a first quadrant.

FIG. 2 shows a situation where the RMS spot diameter of the camera optical lens 10 according to the Embodiment 1 is located in a first quadrant. According to FIG. 2, it can be seen that the camera optical lens 10 according to the Embodiment 1 can achieve good imaging quality.

The following Table 10 shows numerical values in each of the Embodiment 1, the Embodiment 2, and the Embodiment 3 and the parameters already specified in the condition.

As shown in Table 10, the Embodiment 1 satisfies respective condition.

As an example, an entrance pupil diameter ENPD of the camera optical lens 10 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 120.00°, the FOV in the x direction is 106.94°, and the FOV in the y direction is 89.17°. The camera optical lens 10 satisfies the design requirements of a wide angle, ultra-thinness, and a large aperture, and its on-axis and off-axis color aberrations is sufficiently corrected, and the camera optical lens 10 has excellent optical characteristics.

Embodiment 2

The Embodiment 2 is basically the same as the Embodiment 1, and the reference signs in the Embodiment 2 are the same as those in the Embodiment 1, and only a difference thereof will be described in the following.

Figure 3:
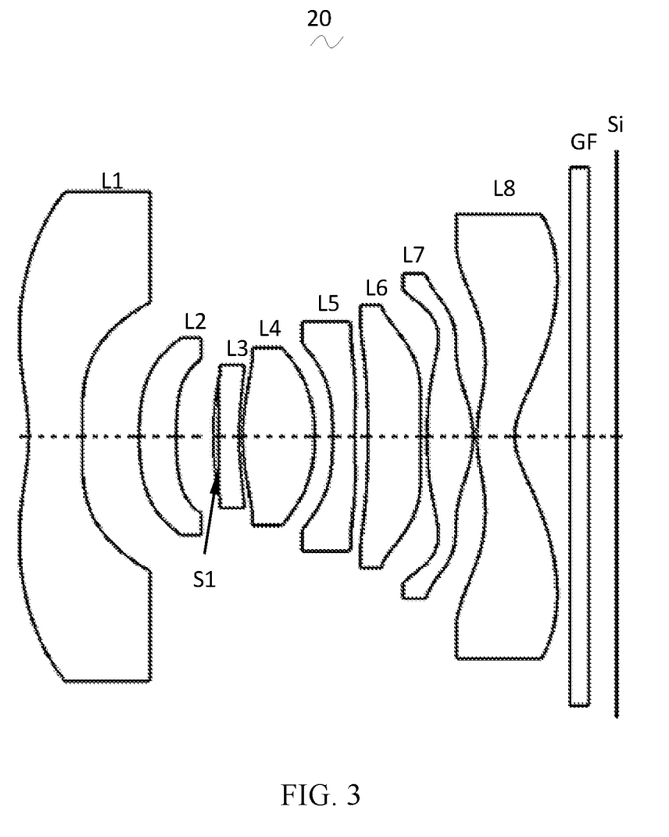
FIG. 3 is a schematic structural diagram of a camera optical lens according to Embodiment 2 of the present disclosure.

Table 4, Table 5, and Table 6 show design data of the camera optical lens 20 according to the Embodiment 2 of the present disclosure. Herein, the object-side surface and the image-side surface of the eighth lens L8 are free-form surfaces.

TABLE 4

|  | R | d |  | nd |  | vd |
|---|---|---|---|---|---|---|
| S1 | ∞ | d0= | −2.064 |  |  |  |
| R1 | −2.017 | d1= | 0.582 | nd1 | 1.5444 | v1 56.43 |
| R2 | −28.571 | d2= | 0.617 |  |  |  |
| R3 | 2.861 | d3= | 0.404 | nd2 | 1.6501 | v2 21.44 |
| R4 | 4.278 | d4= | 0.405 |  |  |  |
| R5 | 4.061 | d5= | 0.282 | nd3 | 1.5444 | v3 56.43 |
| R6 | 3.383 | d6= | 0.040 |  |  |  |
| R7 | 2.274 | d7= | 0.784 | nd4 | 1.5444 | v4 56.43 |
| R8 | −1.925 | d8= | 0.193 |  |  |  |
| R9 | −7.142 | d9= | 0.240 | nd5 | 1.6800 | v5 18.40 |
| R10 | 7.247 | d10= | 0.144 |  |  |  |
| R11 | −9.356 | d11= | 0.573 | nd6 | 1.5444 | v6 56.43 |

TABLE 4-continued

|  | R | d |  | nd |  | vd |
|---|---|---|---|---|---|---|
| R12 | 31.651 | d12= | 0.072 |  |  |  |
| R13 | 6.922 | d13= | 0.501 | nd7 | 1.5444 | v7 56.43 |
| R14 | −1.031 | d14= | 0.040 |  |  |  |
| R15 | 1.435 | d15= | 0.411 | nd8 | 1.5661 | v8 37.70 |
| R16 | 0.632 | d16= | 0.600 |  |  |  |
| R17 | ∞ | d17= | 0.210 | ndg | 1.5168 | vg 64.17 |
| R18 | ∞ | d18= | 0.301 |  |  |  |

Table 5 shows aspherical data of each lens in the camera optical lens 20 according to the Embodiment 2 of the present disclosure.

TABLE 5

|  | Conic coefficient | Aspherical coefficient | | | | |
|---|---|---|---|---|---|---|
|  | k | A4 | A6 | A8 | A10 | A12 |
| R1 | −1.5706E+01 | 8.7529E−02 | −4.4200E−02 | 1.7825E−02 | −5.3298E−03 | 1.1269E−03 |
| R2 | −1.6020E+01 | 3.3552E−01 | −3.4594E−01 | 4.9769E−01 | −5.8556E−01 | 4.9704E−01 |
| R3 | 4.1107E+00 | 1.2456E−01 | −2.1769E−01 | 1.2383E+00 | −3.9967E+00 | 8.4689E+00 |
| R4 | 1.2571E+01 | 1.7804E−01 | 1.0777E−01 | −2.5919E−01 | 2.1822E+00 | −5.6723E+00 |
| R7 | −2.4194E+00 | 8.4381E−02 | 1.6196E−02 | 2.9581E−02 | −8.5438E−02 | 0.0000E+00 |
| R8 | 4.8346E+00 | −1.8301E−01 | 3.7464E−01 | −9.3099E−01 | 1.4753E+00 | −1.1371E+00 |
| R9 | 7.7010E−01 | −1.8426E−01 | 2.3530E−01 | −4.0131E−01 | 2.1315E−01 | 1.4511E−01 |
| R10 | 7.3797E−01 | −1.3973E−01 | 1.7917E−02 | 3.9920E−01 | −1.2036E+00 | 1.7235E+00 |
| R11 | 3.8022E+01 | −4.4151E−01 | 2.5245E−01 | 1.5174E−01 | −4.2158E−01 | 3.5434E−01 |
| R12 | 1.1295E+01 | −2.3391E−01 | 2.7921E−02 | 5.8746E−01 | −1.2689E+00 | 1.4008E+00 |
| R13 | 3.7715E+01 | 6.5369E−02 | −2.3539E−01 | 3.6996E−01 | −1.0019E−01 | −5.5229E−01 |
| R14 | 1.6055E+01 | −9.0351E−03 | −1.6432E−01 | −5.8898E−01 | 1.4995E+00 | −1.4621E+00 |
| R15 | 8.8453E+00 | 2.1381E−01 | −2.7028E−01 | −4.1922E−02 | 5.2670E−01 | −7.3566E−01 |
| R16 | −6.9551E−01 | 5.1317E−01 | −6.9098E−01 | 1.6054E+00 | −2.1433E+00 | 1.6108E+00 |

|  | Conic coefficient | Aspherical coefficient | | | | |
|---|---|---|---|---|---|---|
|  | k | A14 | A16 | A18 | A20 | / |
| R1 | −1.5706E+01 | −1.6157E−04 | 1.4909E−05 | −7.9885E−07 | 1.8889E−08 | / |
| R2 | −1.6020E+01 | −2.7845E−01 | 9.4608E−02 | −1.7164E−02 | 1.2284E−03 | / |
| R3 | 4.1107E+00 | −1.1342E+01 | 9.2086E+00 | −4.1124E+00 | 7.6517E−01 | / |
| R4 | 1.2571E+01 | 7.3671E+00 | −3.6965E+00 | 0.0000E+00 | 0.0000E+00 | / |
| R7 | −2.4194E+00 | 0.0000E+00 | 0.0000E+00 | 0.0000E+00 | 0.0000E+00 | / |
| R8 | 4.8346E+00 | 2.6043E−01 | 0.0000E+00 | 0.0000E+00 | 0.0000E+00 | / |
| R9 | 7.7010E−01 | −1.1297E−01 | 0.0000E+00 | 0.0000E+00 | 0.0000E+00 | / |
| R10 | 7.3797E−01 | −1.3283E+00 | 4.6748E−01 | 0.0000E+00 | 0.0000E+00 | / |
| R11 | 3.8022E+01 | −1.1037E−01 | 0.0000E+00 | 0.0000E+00 | 0.0000E+00 | / |
| R12 | 1.1295E+01 | −8.6157E−01 | 2.7776E−01 | −3.6896E−02 | 0.0000E+00 | / |
| R13 | 3.7715E+01 | 8.7662E−01 | −5.8357E−01 | 1.8767E−01 | −2.4031E−02 | / |
| R14 | 1.6055E+01 | 7.4157E−01 | −1.9341E−01 | 2.0525E−02 | 0.0000E+00 | / |
| R15 | 8.8453E+00 | 5.0164E−01 | −1.8843E−01 | 3.7547E−02 | −3.1076E−03 | / |
| R16 | −6.9551E−01 | −7.2824E−01 | 1.9827E−01 | −2.9991E−02 | 1.9365E−03 | / |

Table 6 shows the free-form surface data in the camera optical lens 20 according to the Embodiment 2 of the present disclosure.

TABLE 6

| Free-form surface coefficient | | | | | | | | |
|---|---|---|---|---|---|---|---|---|
|  | k | $X^4Y^0$ | $X^2Y^2$ | $X^0Y^4$ | $X^6Y^0$ | $X^4Y^2$ | $X^2Y^4$ | $X^0Y^6$ |
| R15 | −1.0004E+00 | −4.2029E−01 | −8.4187E−01 | −4.2023E−01 | 1.1343E−01 | 3.4174E−01 | 3.4068E−01 | 1.1346E−01 |
| R16 | −3.0063E+00 | −2.2940E−01 | −4.5999E−01 | −2.2944E−01 | 1.8729E−01 | 5.6282E−01 | 5.6210E−01 | 1.8763E−01 |

|  | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R15 | 1.7164E−01 | 6.8637E−01 | 1.0301E+00 | 6.8672E−01 | 1.7162E−01 | −2.1801E−01 | −1.0902E+00 | −2.1804E+00 |
| R16 | −1.0309E−01 | −4.1265E−01 | −6.1854E−01 | −4.1245E−01 | −1.0332E−01 | 3.7935E−02 | 1.8970E−01 | 3.7944E−01 |

TABLE 6-continued

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R15 | −2.1806E+00 | −1.0900E+00 | −2.1808E−01 | 1.1812E−01 | 7.0869E−01 | 1.7718E+00 | 2.3623E+00 | 1.7717E+00 |
| R16 | 3.7924E−01 | 1.8973E−01 | 3.7959E−02 | −9.2978E−03 | −5.5780E−02 | −1.3948E−01 | −1.8595E−01 | −1.3944E−01 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R15 | 7.0875E−01 | 1.1813E−01 | −3.6103E−02 | −2.5271E−01 | −7.5815E−01 | −1.2635E+00 | −1.2636E+00 | −7.5815E−01 |
| R16 | −5.5790E−02 | −9.2843E−03 | 1.4889E−03 | 1.0422E−02 | 3.1266E−02 | 5.2110E−02 | 5.2115E−02 | 3.1263E−02 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R15 | −2.5275E−01 | −3.6088E−02 | 6.4611E−03 | 5.1694E−02 | 1.8092E−01 | 3.6186E−01 | 4.5232E−01 | 3.6187E−01 |
| R16 | 1.0421E−02 | 1.4889E−03 | −1.4897E−04 | −1.1919E−03 | −4.1714E−03 | −8.3414E−03 | −1.0429E−02 | −8.3410E−03 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R15 | 5.1680E−02 | 6.4625E−03 | −6.3527E−04 | −5.7157E−03 | −2.2866E−02 | −5.3349E−02 | −8.0035E−02 | 5.1680E−02 |
| R16 | −1.1905E−03 | −1.5076E−04 | 8.423E−06 | 7.5775E−05 | 3.0314E−04 | 7.0764E−04 | 1.0610E−03 | −1.1905E−03 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R15 | −8.0028E−02 | −5.3336E−02 | −2.2867E−02 | −5.7193E−03 | −6.3999E−04 | 2.6653E−05 | 2.6586E−04 | 1.1967E−03 |
| R16 | 1.0610E−03 | 7.0798E−04 | 3.0229E−04 | 7.6189E−05 | 8.5230E−06 | −2.0523E−07 | −2.0414E−06 | −9.2116E−06 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R15 | 3.1943E−03 | 5.5827E−03 | 6.6971E−03 | 5.5907E−03 | 3.2007E−03 | 1.1777E−03 | 2.7549E−04 | 2.7397E−05 |
| R16 | −2.4532E−05 | −4.3074E−05 | −5.1645E−05 | −4.2867E−05 | −2.4340E−05 | −9.4238E−06 | −2.0344E−06 | −1.6747E−07 |

Figure 4:
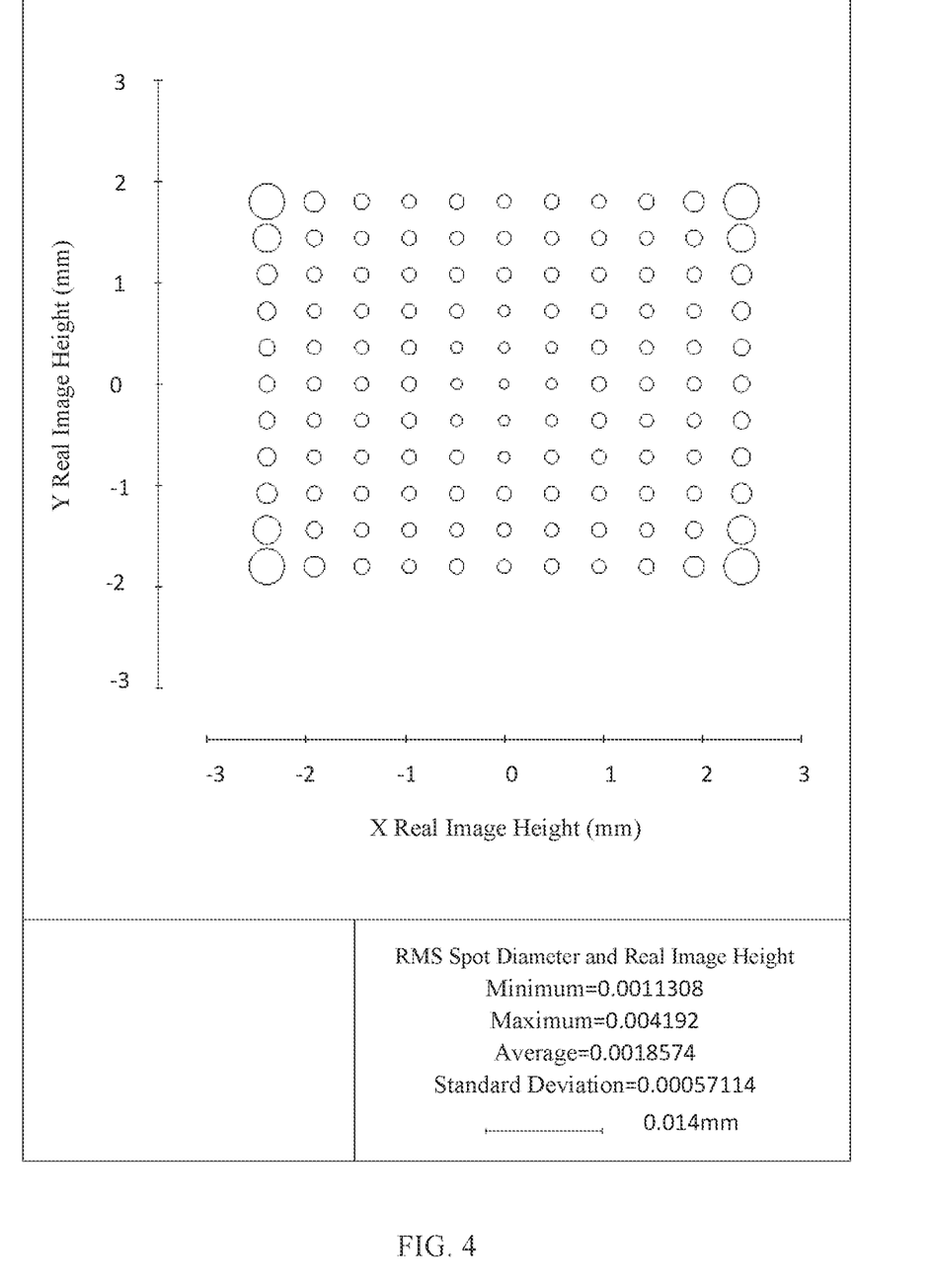
FIG. 4 illustrates a situation where RMS spot diameter of the camera optical lens shown in FIG. 3 is located in a first quadrant.

FIG. 4 shows a situation where the RMS spot diameter of the camera optical lens 20 according to the Embodiment 2 is within a first quadrant. According to FIG. 4, it can be seen that the camera optical lens 20 according to the Embodiment 2 can achieve good imaging quality.

As shown in Table 10, the Embodiment 2 satisfies respective condition.

As an example, the entrance pupil diameter ENPD of the camera optical lens 20 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 119.99°, the FOV in the x direction is 107.4°, and the FOV in the y direction is 89.91°. The camera optical lens 20 satisfies the design requirements of a wide angle, ultra-thinness, and a large aperture, and its on-axis and off-axis color aberration is sufficiently corrected, and the camera optical lens 20 has excellent optical characteristics.

Embodiment 3

The Embodiment 3 is basically the same as the Embodiment 1, and the reference signs in the Embodiment 3 are the same as those in the Embodiment 1, and only a difference thereof will be described in the following.

Figure 5:
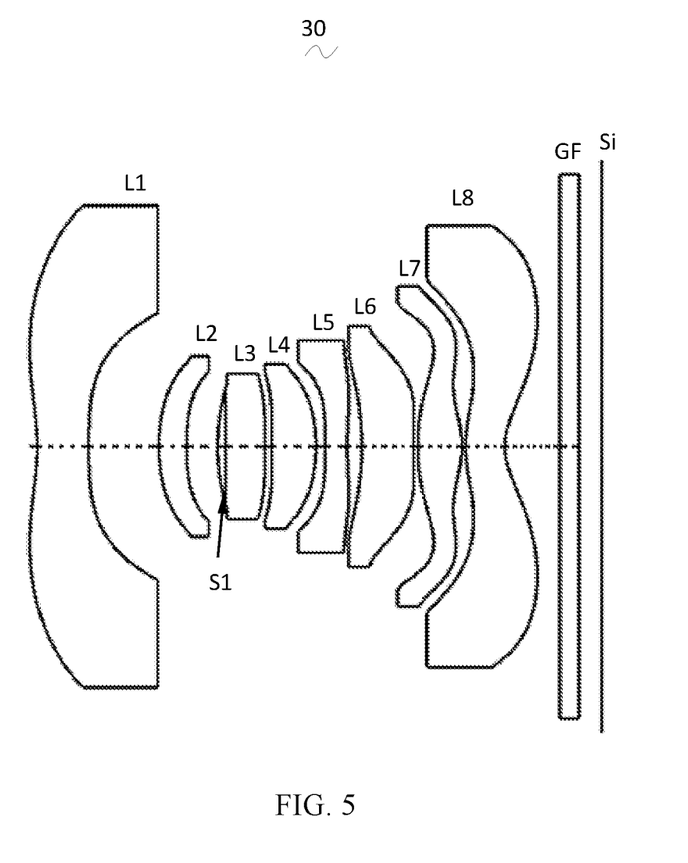
FIG. 5 is a schematic structural diagram of a camera optical lens according to Embodiment 3 of the present disclosure.

The third lens L3 has a positive refractive power, the image-side surface of the first lens L1 is concave in a paraxial region, and the image-side surface of the third lens L3 is convex in a paraxial region.

Table 7, Table 8, and Table 9 show design data of the camera optical lens 30 according to the Embodiment 3 of the present disclosure. Herein, the object-side surface and the image-side surface of the third lens L3 are free-form surfaces.

TABLE 7

| | R | d | | nd | | vd | |
|---|---|---|---|---|---|---|---|
| S1 | ∞ | d0= | −2.049 | | | | |
| R1 | −2.327 | d1= | 0.563 | nd1 | 1.5444 | v1 | 56.43 |
| R2 | 20.181 | d2= | 0.762 | | | | |
| R3 | 2.031 | d3= | 0.300 | nd2 | 1.6610 | v2 | 20.53 |
| R4 | 2.778 | d4= | 0.341 | | | | |
| R5 | 2.633 | d5= | 0.519 | nd3 | 1.5444 | v3 | 56.43 |
| R6 | −14.637 | d6= | 0.072 | | | | |
| R7 | 209.539 | d7= | 0.482 | nd4 | 1.5444 | v4 | 56.43 |
| R8 | −1.784 | d8= | 0.099 | | | | |
| R9 | −12.881 | d9= | 0.240 | nd5 | 1.6800 | v5 | 18.40 |
| R10 | 4.959 | d10= | 0.157 | | | | |
| R11 | −3.660 | d11= | 0.566 | nd6 | 1.5444 | v6 | 56.43 |
| R12 | 10.873 | d12= | 0.047 | | | | |
| R13 | 3.278 | d13= | 0.482 | nd7 | 1.5444 | v7 | 56.43 |
| R14 | −1.023 | d14= | 0.040 | | | | |
| R15 | 1.619 | d15= | 0.426 | nd8 | 1.6032 | v8 | 28.29 |
| R16 | 0.657 | d16= | 0.600 | | | | |
| R17 | ∞ | d17= | 0.210 | ndg | 1.5168 | vg | 64.17 |
| R18 | ∞ | d18= | 0.244 | | | | |

Table 8 shows aspherical data of each lens in the camera optical lens 30 according to the Embodiment 3 of the present disclosure.

TABLE 8

| | Conic coefficient | Aspherical coefficient | | | | |
|---|---|---|---|---|---|---|
| | k | A4 | A6 | A8 | A10 | A12 |
| R1 | −2.0037E+01 | 8.1403E−02 | −4.0094E−02 | 1.6238E−02 | −4.8785E−03 | 1.0506E−03 |
| R2 | −5.1785E+00 | 2.8741E−01 | −2.9677E−01 | 4.3202E−01 | −5.2408E−01 | 4.6312E−01 |
| R3 | −4.4106E−01 | 6.6968E−02 | 2.2530E−01 | −1.2572E+00 | 4.5880E+00 | −9.4251E+00 |
| R4 | 8.4373E+00 | 1.1966E−01 | −1.6207E−01 | 1.2254E+00 | −3.1527E+00 | 4.2533E+00 |
| R7 | −1.0000E+01 | −1.3837E−01 | −2.6734E−01 | 5.2773E−01 | −1.3654E+00 | 4.2249E+00 |
| R8 | 1.1017E+00 | −3.4207E−02 | −3.5740E−01 | 9.7927E−01 | −2.0262E+00 | 3.0254E+00 |
| R9 | 1.0000E+01 | −2.6812E−01 | −4.4693E−01 | 1.3354E+00 | −2.9925E+00 | 5.1228E+00 |
| R10 | −7.8834E+00 | −1.4199E−01 | −1.9330E−01 | 6.7648E−01 | −1.2832E+00 | 1.7180E+00 |
| R11 | −6.0214E+00 | −4.8914E−02 | 2.9088E−02 | 2.2083E−01 | −1.0954E+00 | 2.0282E+00 |
| R12 | −1.0000E+01 | 1.4059E−02 | −1.7220E+00 | 3.4729E+00 | −3.4952E+00 | 1.6901E+00 |
| R13 | 2.2054E+00 | 4.4949E−01 | −1.4606E+00 | 2.5776E+00 | −2.9013E+00 | 1.9562E+00 |
| R14 | −6.9015E−01 | 8.7539E−01 | −6.2159E−01 | 5.1237E−01 | −7.0253E−01 | 6.7111E−01 |
| R15 | −1.4196E+00 | −1.8820E−01 | −4.4679E−01 | 9.0040E−01 | −7.5785E−01 | 3.4134E−01 |
| R16 | −3.5687E+00 | −1.9765E−01 | 1.1498E−01 | −3.4409E−02 | −9.7782E−04 | 4.6252E−03 |

| | Conic coefficient | Aspherical coefficient | | | | |
|---|---|---|---|---|---|---|
| | k | A14 | A16 | A18 | A20 | / |
| R1 | −2.0037E+01 | −1.5601E−04 | 1.5106E−05 | −8.5693E−07 | 2.1633E−08 | / |
| R2 | −5.1785E+00 | −2.7367E−01 | 1.0165E−01 | −2.1251E−02 | 1.8816E−03 | / |
| R3 | −4.4106E−01 | 1.1165E+01 | −7.0512E+00 | 1.7849E+00 | 0.0000E+00 | / |
| R4 | 8.4373E+00 | −1.6974E+00 | −1.0423E+00 | 0.0000E+00 | 0.0000E+00 | / |
| R7 | −1.0000E+01 | 4.2249E+00 | −6.7690E+00 | 5.6328E+00 | −1.9472E+00 | / |
| R8 | 1.1017E+00 | 3.0254E+00 | −2.4816E+00 | 5.8197E−01 | 3.1259E−01 | / |
| R9 | 1.0000E+01 | 5.1228E+00 | −5.3296E+00 | 2.4988E+00 | −2.5171E+00 | / |
| R10 | −7.8834E+00 | 1.7180E+00 | −1.3601E+00 | 5.6718E−01 | −1.0212E−01 | / |
| R11 | −6.0214E+00 | 2.0282E+00 | −1.7638E+00 | 7.4094E−01 | −1.2235E−01 | / |
| R12 | −1.0000E+01 | 1.6901E+00 | 9.5623E−02 | −5.7245E−01 | 2.7510E−01 | / |
| R13 | 2.2054E+00 | 1.9562E+00 | −7.4825E−01 | 1.3646E−01 | −3.3859E−03 | / |
| R14 | −6.9015E−01 | 6.7111E−01 | −3.7182E−01 | 1.1837E−01 | −2.0218E−02 | / |
| R15 | −1.4196E+00 | 3.4134E−01 | −8.1866E−02 | 8.3359E−03 | 1.7868E−04 | / |
| R16 | −3.5687E+00 | 4.6252E−03 | −1.6822E−03 | 2.9746E−04 | −2.7120E−05 | / |

Table 9 shows free-form surface data in the camera optical lens 30 according to the Embodiment 3 of the present disclosure.

TABLE 9

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R5 | −1.7994E+00 | 4.9024E−02 | 9.6861E−02 | 4.8907E−02 | 2.3278E−02 | 7.2288E−02 | 7.8862E−02 | 2.6737E−02 |
| R6 | 1.7100E+00 | −1.5495E−01 | −3.1005E−01 | −1.5482E−01 | −1.7795E−01 | −5.3170E−01 | −5.3135E−01 | −1.7692E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R5 | −2.7408E−02 | −1.1944E−01 | −1.7031E−01 | −1.4891E−01 | −4.4685E−02 | 3.4906E−02 | 2.1281E−01 | 2.7212E−01 |
| R6 | 5.6970E−01 | 2.3061E+00 | 3.3944E+00 | 2.2557E+00 | 5.6373E−01 | −1.0509E+00 | −5.3494E+00 | −1.0441E+01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R5 | 3.3282E−01 | 2.1605E−01 | 4.7636E−02 | 3.5008E−03 | 6.5900E−03 | 5.9814E−01 | 3.1499E−01 | 4.5276E−01 |
| R6 | −1.0583E+01 | −5.2363E+00 | −1.0444E+00 | 1.7794E+00 | 1.0674E+01 | 2.6727E+01 | 3.5762E+01 | 2.7028E+01 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R5 | 3.3416E−01 | 6.9986E−02 | −1.3296E−01 | −9.4359E−01 | −3.8970E+00 | −4.6118E+00 | −6.2409E+00 | −3.4048E+00 |
| R6 | 1.0828E+01 | 1.7912E+00 | −1.2075E+00 | −8.3443E+00 | −2.5361E+01 | −4.2598E+01 | −4.2622E+01 | −2.5702E+01 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R5 | −1.6045E+00 | −2.2955E−01 | 0.0000E+00 | 0.0000E+00 | 0.0000E+00 | 0.0000E+00 | 0.0000E+00 | 0.0000E+00 |
| R6 | −8.7027E+00 | −1.2257E+00 | 0.0000E+00 | 0.0000E+00 | 0.0000E+00 | 0.0000E+00 | 0.0000E+00 | 0.0000E+00 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |

TABLE 9-continued

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |

Figure 6:
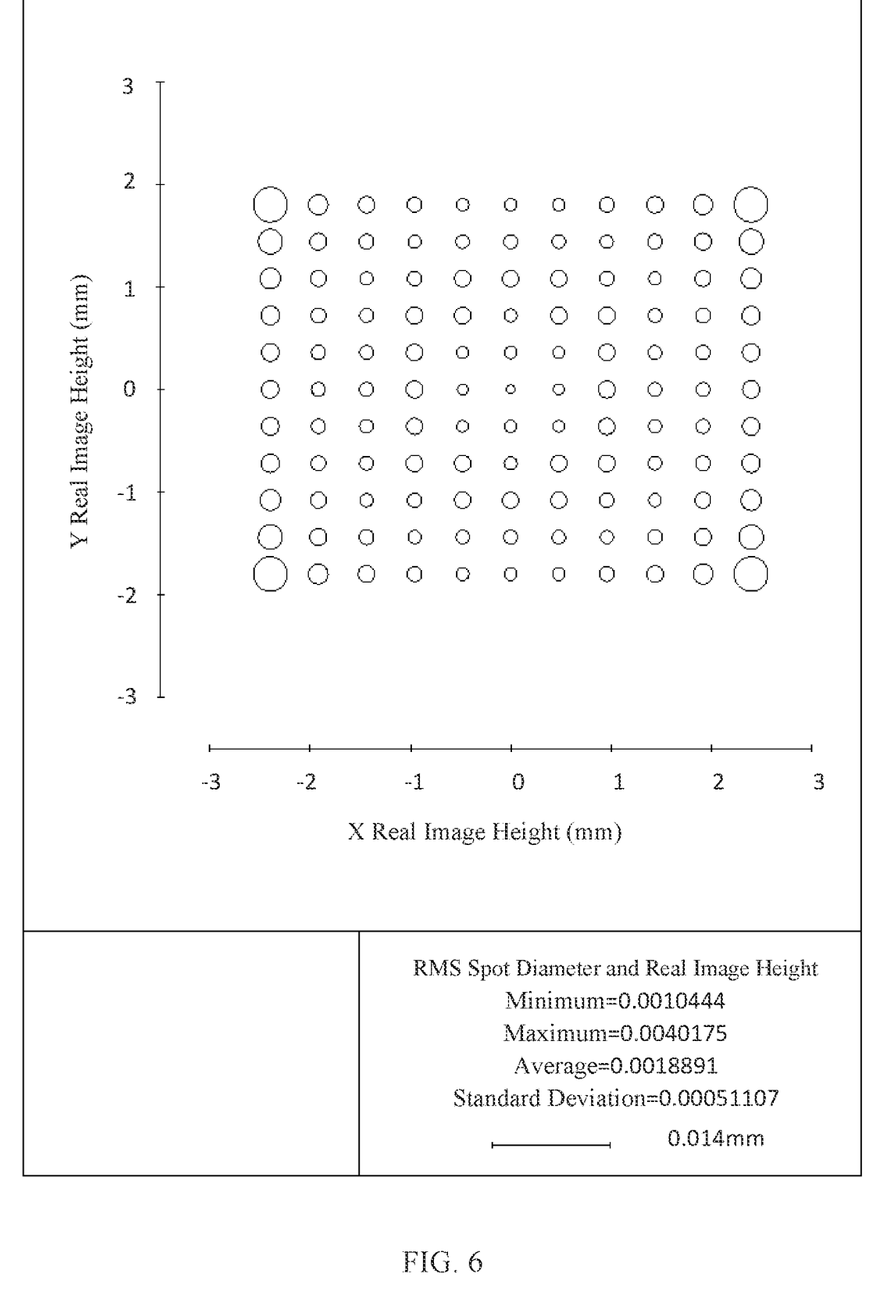
FIG. 6 illustrates a situation where RMS spot diameter of the camera optical lens shown in FIG. 5 is located in a first quadrant.

FIG. 6 shows a situation where the RMS spot diameter of the camera optical lens 30 according to the Embodiment 3 is located in a first quadrant. According to FIG. 6, it can be seen that the camera optical lens 30 according to the Embodiment 3 can achieve good imaging quality.

The following Table 10 lists the respective numerical value corresponding to each condition in this embodiment according to the above-mentioned condition. Obviously, the imaging optical system according to this embodiment satisfies the above-mentioned condition.

As an example, the entrance pupil diameter ENPD of the camera optical lens 30 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 120.00°, the FOV in the x direction is 107.33°, and the FOV in the y direction is 90.89°. The camera optical lens 30 satisfies the design requirements of a wide angle, ultra-thinness, and a large aperture, and its on-axis and off-axis color aberration is sufficiently corrected, and the camera optical lens 20 has excellent optical characteristics.

TABLE 10

| Parameters and condition expression | Embodiment 1 | Embodiment 2 | Embodiment 3 |
|---|---|---|---|
| f6/f5 | 2.90 | 2.53 | 0.95 |
| R12/R11 | −5.43 | −3.38 | −2.97 |
| d7/d6 | 20.70 | 19.60 | 6.69 |
| f | 1.80 | 1.80 | 1.80 |
| f1 | −4.04 | −4.00 | −3.79 |
| f2 | 10.22 | 11.84 | 9.77 |
| f3 | −15.92 | −43.48 | 4.13 |
| f4 | 1.97 | 2.04 | 3.24 |
| f5 | −5.20 | −5.20 | −5.19 |
| f6 | −15.09 | −13.16 | −4.95 |
| f7 | 1.68 | 1.68 | 1.49 |
| f8 | −2.40 | −2.44 | −2.19 |
| FNO | 1.80 | 1.80 | 1.80 |
| TTL | 6.40 | 6.40 | 6.15 |
| FOV | 120.00° | 119.99° | 120.00° |
| IH | 6.00 | 6.00 | 6.00 |

It should be understood by those skilled in the art that the above embodiments are merely some specific embodiments of the present disclosure, and various changes in form and details may be made without departing from the scope of the present disclosure.

What is claimed is:

1. A camera optical lens, comprising, from an object side to an image side, a first lens, a second lens, a third lens, a fourth lens, a fifth lens, a sixth lens, a seventh lens, and an eighth lens, wherein at least one of the first lens, the second lens, the third lens, the fourth lens, the fifth lens, the sixth lens, the seventh lens, or the eighth lens has a free-form surface, and wherein the camera optical lens satisfies:

$0.80 \leq f6/f5 \leq 3.00$;

$5.00 \leq d7/d6 \leq 22.00$; and $-6.00 \leq R12/R11 \leq -2.50$, where f5 denotes a focal length of the fifth lens, f6 denotes a focal length of the sixth lens, d6 denotes an on-axis distance from an image-side surface of the third lens to an object-side surface of the fourth lens, d7 denotes an on-axis thickness of the fourth lens, R11 denotes a central curvature radius of an object-side surface of the sixth lens, and R12 denotes a central curvature radius of an image-side surface of the sixth lens.

2. The camera optical lens as described in claim 1, wherein the camera optical lens satisfies:

$-4.49 \leq f1/f \leq -1.40$;

$-2.30 \leq (R1+R2)/(R1-R2) \leq -0.53$; and $0.05 \leq d1/TTL \leq 0.14$;

where f denotes a focal length of the camera optical lens, f1 denotes a focal length of the first lens, R1 denotes a central curvature radius of an object-side surface of the first lens, R2 denotes a central curvature radius of an image-side surface of the first lens, d1 denotes an on-axis thickness of the first lens, and TTL denotes a total optical length from the object-side surface of the first lens to an image plane of the camera optical lens along an optic axis.

3. The camera optical lens as described in claim 1, wherein the camera optical lens satisfies:

$2.71 \leq f2/f \leq 9.86$;

$-12.88 \leq (R3+R4)/(R3-R4) \leq -2.18$; and $0.02 \leq d3/TTL \leq 0.09$;

where f denotes a focal length of the camera optical lens, f2 denotes a focal length of the second lens, R3 denotes a central curvature radius of an object-side surface of the second lens, R4 denotes a central curvature radius of an image-side surface of the second lens, d3 denotes an on-axis thickness of the second lens, and TTL denotes a total optical length from an object-side surface of the first lens to an image plane of the camera optical lens along an optic axis.

4. The camera optical lens as described in claim 1, wherein the camera optical lens satisfies:

$-48.31 \leq f3/f \leq 3.44$;

$-1.39 \leq (R5+R6)/(R5-R6) \leq 16.47$; and $0.02 \leq d5/TTL \leq 0.13$, where f denotes a focal length of the camera optical lens, f3 denotes a focal length of the third lens, R5 denotes a central curvature radius of an object-side surface of the third lens, R6 denotes a central curvature radius of an image-side surface of the third lens, d5 denotes an on-axis thickness of the third lens, and TTL denotes a total optical length from an object-side surface of the first lens to an image plane of the camera optical lens along an optic axis.

5. The camera optical lens as described in claim 1, wherein the camera optical lens satisfies:

$0.55 \le f4/f \le 2.70$;

$-0.06 \le (R7+R8)/(R7-R8) \le 1.47$; and $0.04 \le d7/TTL \le 0.19$;

where f denotes a focal length of the camera optical lens, f4 denotes a focal length of the fourth lens, R7 denotes a central curvature radius of an object-side surface of the fourth lens, R8 denotes a central curvature radius of an image-side surface of the fourth lens, and TTL denotes a total optical length from an object-side surface of the first lens to an image plane of the camera optical lens along an optic axis.

6. The camera optical lens as described in claim 1, wherein the camera optical lens satisfies:

$-5.78 \le f5/f \le -1.92$;

$-0.01 \le (R9+R10)/(R9-R10) \le 0.67$; and $0.02 \le d9/TTL \le 0.06$;

where f denotes a focal length of the camera optical lens, f5 denotes a focal length of the fifth lens, R9 denotes a central curvature radius of an object-side surface of the fifth lens, R10 denotes a central curvature radius of an image-side surface of the fifth lens, d9 denotes an on-axis thickness of the fifth lens, and TTL denotes a total optical length from an object-side surface of the first lens to an image plane of the camera optical lens along an optic axis.

7. The camera optical lens as described in claim 1, wherein the camera optical lens satisfies:

$-16.76 \le f6/f \le -1.83$;

$-1.38 \le (R11+R12)/(R11-R12) \le -0.33$; and $0.04 \le d11/TTL \le 0.14$, where f denotes a focal length of the camera optical lens, d11 denotes an on-axis thickness of the sixth lens, and TTL denotes a total optical length from an object-side surface of the first lens to an image plane of the camera optical lens along an optic axis.

8. The camera optical lens as described in claim 1, wherein the camera optical lens satisfies:

$0.41 \le f7/f \le 1.40$;

$0.26 \le (R13+R14)/(R13-R14) \le 1.12$; and $0.04 \le d13/TTL \le 0.12$, where f denotes a focal length of the camera optical lens, f7 denotes a focal length of the seventh lens, R13 denotes a central curvature radius of an object-side surface of the seventh lens, R14 denotes a central curvature radius of an image-side surface of the seventh lens, d13 denotes an on-axis thickness of the seventh lens, and TTL denotes a total optical length from an object-side surface of the first lens to an image plane of the camera optical lens along an optic axis.

9. The camera optical lens as described in claim 1, wherein the camera optical lens satisfies:

$-2.71 \le f8/f \le -0.18$;

$1.18 \le (R15+R16)/(R15-R16) \le 4.11$; and $0.03 \le d15/TTL \le 0.10$, where f denotes a focal length of the camera optical lens, f8 denotes a focal length of the eighth lens, R15 denotes a central curvature radius of an object-side surface of the eighth lens, R16 denotes a central curvature radius of an image-side surface of the eighth lens, d15 denotes an on-axis thickness of the eighth lens, and TTL denotes a total optical length from an object-side surface of the first lens to an image plane of the camera optical lens along an optic axis.

* * * * *